(12) United States Patent
Ohno et al.

(10) Patent No.: US 10,100,908 B2
(45) Date of Patent: Oct. 16, 2018

(54) SHAFT END ADAPTER AND BALL SCREW ASSEMBLY

(71) Applicants: KURODA PRECISION INDUSTRIES LTD., Kanagawa (JP); Y.M. LABORATORY CO., LTD., Kanagawa (JP)

(72) Inventors: Toshiaki Ohno, Kimitsu (JP); Katsuhiko Sato, Sagamihara (JP)

(73) Assignees: Kuroda Precision Industries Ltd., Kawasaki-shi, Kanagawa (JP); Y.M. Laboratory Co., Ltd., Kawasaki-shi, Kanagawa (JP)

( * ) Notice: Subject to any disclaimer, the term of this patent is extended or adjusted under 35 U.S.C. 154(b) by 561 days.

(21) Appl. No.: 14/392,046

(22) PCT Filed: Nov. 30, 2012

(86) PCT No.: PCT/JP2012/007694
§ 371 (c)(1),
(2) Date: May 11, 2015

(87) PCT Pub. No.: WO2014/083597
PCT Pub. Date: Jun. 5, 2014

(65) Prior Publication Data
US 2015/0323050 A1    Nov. 12, 2015

(51) Int. Cl.
F16H 25/20    (2006.01)
F16H 25/24    (2006.01)
F16B 7/04    (2006.01)

(52) U.S. Cl.
CPC ........... *F16H 25/24* (2013.01); *F16B 7/0426* (2013.01); *F16H 25/20* (2013.01);
(Continued)

(58) Field of Classification Search
CPC .. F16H 25/24; F16H 25/20; F16H 2025/2037; F16H 2025/2481; F16B 7/0406; F16B 7/0413; F16B 7/042; F16B 7/182
See application file for complete search history.

(56) References Cited

U.S. PATENT DOCUMENTS 3,736,010 A * 5/1973 Larkin .................... B64C 27/54
                                                           16/429
5,588,336 A * 12/1996 Chou ..................... B62K 21/18
                                                           280/279

(Continued)

FOREIGN PATENT DOCUMENTS

JP    41-15214 Y1    7/1966
JP    52-20823 U    2/1977
(Continued)

*Primary Examiner* — Jonathan P Masinick
(74) *Attorney, Agent, or Firm* — Marshall & Melhorn, LLC

(57) ABSTRACT

The assembly of a shaft member and a shaft end adapter which are manufactured separately can be accomplished with a high precision in coaxiality and straightness at a high efficiency. A tubular portion is formed with a circumferentially continuous portion at least in a part thereof adjoining a free end thereof, and a slit extends axially through a wall of the tubular portion in exclusion of the circumferentially continuous portion. A fastening bolt configured to close the slit is mounted on the tubular portion.

10 Claims, 17 Drawing Sheets

(52) U.S. Cl.
CPC ............... *F16H 2025/2037* (2013.01); *F16H 2025/2481* (2013.01); *Y10T 74/1987* (2015.01); *Y10T 403/5706* (2015.01)

(56) References Cited

U.S. PATENT DOCUMENTS

| | | | |
|---|---|---|---|
| 6,186,027 B1* | 2/2001 | Nielsen | B62K 21/18 |
| | | | 403/365 |
| 6,413,006 B1 | 7/2002 | Neugart | |
| 8,495,924 B2 | 7/2013 | Fukano et al. | |
| 2014/0260747 A1* | 9/2014 | Kuroiwa | F16H 25/2418 |
| | | | 74/424.81 |
| 2015/0240924 A1* | 8/2015 | Lee | F16H 25/24 |
| | | | 74/89.36 |
| 2017/0292591 A1* | 10/2017 | Iwasaki | F16H 25/2219 |

FOREIGN PATENT DOCUMENTS

| | | |
|---|---|---|
| JP | 2-80228 U | 6/1990 |
| JP | 10-103434 A | 4/1998 |
| JP | 2000-91679 A | 3/2000 |
| JP | 2005-114081 A | 4/2005 |
| JP | 2009-275914 A | 11/2009 |
| JP | 2012-096681 A | 5/2012 |
| TW | M430540 U | 6/2012 |

\* cited by examiner

US 10,100,908 B2

SHAFT END ADAPTER AND BALL SCREW ASSEMBLY

TECHNICAL FIELD

The present invention relates to a shaft end adapter and a ball screw assembly, and in particular to a shaft end adapter configured to be attached to an end of a shaft such as a ball screw shaft, and a ball screw assembly incorporated with such a shaft end adapter.

BACKGROUND OF THE INVENTION

The ball screw shaft used in a lead screw mechanism is provided with a mounting shaft portion having no screw thread formed thereon at one end thereof for mounting a bearing member or a drive gear thereon.

The mounting shaft portion is typically integrally formed with the ball screw shaft, and it was necessary to use a special machine tool and a jig for machining the mounting shaft portion. Even when the thread of the ball screw shaft is the same, the configuration of the mounting shaft portion may vary depending on the need of the user. Similarly, even when the configuration of the mounting shaft portion is the same, the length of the threaded shaft may vary. Such variations inevitably created bottlenecks in the manufacturing process. Furthermore, the threaded shaft portion is quenched along with the mounting shaft portion, but the mounting shaft portion is required to be annealed because the quenched member cannot be easily machined.

In connection with such a ball screw shaft, it is known to manufacture the mounting shaft portion (shaft end adapter) and the screw shaft portion as separate component parts, and integrally join the two parts by brazing, welding or shrink fitting. See Patent Documents 1 and 2.

PRIOR ART DOCUMENTS

Patent Documents

Patent Document 1: JP2005-114081A
Patent Document 2: JP2009-275914A

SUMMARY OF THE INVENTION

Task to be Accomplished by the Invention

When a shaft member such as a screw shaft portion is integrally formed with the mounting shaft portion, the coaxiality and the straightness (run-out precision) of the two shaft portions can be easily ensured according to the available machining precision. However, when the screw shaft portion and the mounting shaft portion are fabricated as two separate members, and integrally joined to each other by brazing, welding or shrink fitting, the precision in joining the two shaft portions to each other strongly affects the coaxiality and the straightness (run-out precision) of the two shaft portions, in addition to the machining precision of the two shaft portions.

To achieve a required precision in the coaxiality and the straightness of the two shaft portions when the screw shaft portion and the mounting shaft portion are fabricated as two separate members, it is necessary to improve the precision in joining the two shaft portions. However, the joining process based on brazing, welding or shrink fitting does not allow any fine adjustment of the coaxiality and the straightness, and the inevitable thermal deformation prevents a desired high precision in the coaxiality and the straightness to be achieved. As a result, considerable variations among the products cannot be avoided.

A primary task of the present invention is to manufacture an assembly of a shaft member and a mounting shaft portion (shaft end adapter) fabricated as two separate components with a high precision in coaxiality and straightness in an efficient manner.

Means to Accomplish the Task

The present invention provides a shaft end adapter, comprising: a tubular portion (24, 64) having an axial bore (26, 66) defining an opening for receiving an end of a shaft member (10) at a free end of the tubular portion, the tubular portion (24, 64) being formed with a circumferentially continuous portion (32, 72) at least in a part thereof adjoining the free end thereof and a slit (30, 70) extending axially through a wall of the tubular portion (24, 64) in exclusion of the circumferentially continuous portion; and a clamp member (42, 82, 86, 90, 94) mounted on the tubular portion (24, 64) and configured to close the slit (30, 70).

According to this arrangement, because the part of the tubular portion (24, 64) adjacent to the open end (26B, 66B) of the axial bore (26, 66) defines a circumferential continuous surface by the circumferentially continuous portion (32, 72), and demonstrates a high stiffness owing to the completely closed annular cross section thereof, even when the tubular portion (24, 64) is caused to undergo an elastic deformation in the direction to close the slit (30, 70), this part is less susceptible to elastic deformation, and maintains a truly circular configuration. Therefore, the assembly of the shaft member (10) and the shaft end adapter (20, 60) which are manufactured separately can be accomplished simply by the operation of the clamp member (42, 82, 90, 94) with a high precision in coaxiality and straightness in a highly efficient manner.

Preferably, the shaft end adapter of the present invention is configured such that the circumferentially continuous portion (32, 72) defines a circumferentially continuous inner circumferential surface adjacent to an open end of the axial bore (26, 66).

According to this arrangement, because the circumferentially continuous portion (32, 72) defined a circumferential continuous surface adjacent to the free end of the tubular portion (24, 64) at a same inner diameter as the axial bore (26, 66), the axial bore (26, 66) in this region is ensured to have a truly circular configuration.

Preferably, in the shaft end adapter of the present invention, the circumferentially continuous portion (32, 72) defines an axial end surface (24D, 64D) of the tubular portion (24, 64) at an open end of the tubular portion as a circumferentially continuous surface.

According to this arrangement, because the circumferentially continuous portion (32, 72) defines an axial end surface (24D, 64D) of the tubular portion (24, 64) as a circumferentially continuous surface, the part of the axial bore (26, 66) adjacent to the open end thereof is ensured to have a truly circular configuration.

Preferably, in the shaft end adapter of the present invention, the slit (30, 70) extends axially in the wall of the tubular portion (24, 64) in exclusion of a circumferentially continuous portion (34, 74) formed adjacent to a base end thereof axially remote from the free end.

According to this arrangement, because the part of the tubular portion (24, 64) adjacent to the base end of the axial bore (26, 66) also defines a circumferentially continuous surface by the circumferentially continuous portion (34, 74), and is thereby given with a high stiffness owing to the completely closed annular configuration thereof, this part is made highly resistant to elastic deformation, and is allowed to maintain a truly circular cross section. Therefore, the assembly of the shaft member (10) and the shaft end adapter (20, 60) can be accomplished simply by the operation of the clamp members (42, 82, 90, 94) with a high precision in coaxiality and axial straightness in a highly efficient manner.

Preferably, in the shaft end adapter of the present invention, a plurality of threaded holes (44, 48) are passed radially across the tubular portion (24) at circumferentially different locations, each defining an open end in the axial bore (26), and a screw member (46, 50) is threaded into each of the threaded holes (44, 48), each screw member being configured to abut an outer circumferential surface of the shaft member (10) at a free end thereof.

According to this arrangement, by individually adjusting the threading amounts of the screw members (46, 50), and thereby adjusting the radial pressures that the screw members (46, 50) apply to the shaft member (10), the tilting of the central axial line of the shaft member (10) with respect to the central axial line of the axial bore (26) can be finely adjusted so that an extremely high precision in straightness can be achieved.

Preferably, in the shaft end adapter of the present invention, the shaft member comprises a ball screw shaft (10), and at least one of the screw members is configured to engage a thread groove (12) of the ball screw shaft.

According to this arrangement, the screw members (46, 50) also serve as a stopper for preventing the ball screw shaft (10) from coming off from the axial bore (26).

Preferably, in the shaft end adapter of the present invention, a flange portion (100) is integrally formed in a base end of the tubular portion (24) axially remote from the free end thereof via a shaft portion (102), and a plurality of through holes (106) are axially passed through the flange portion (100) at different circumferential positions, the tubular portion (24) being formed with a plurality of threaded holes (108) opening out in an end surface of the base end of the tubular portion in alignment with the corresponding through holes (106) of the flange portion (100), and a screw member (110) passed into each of the through hole (106) being threaded into the corresponding threaded hole (108).

According to this arrangement, by individually adjusting the threading amounts of the screw members (110) into the threaded holes (108), and thereby causing a corresponding bending deformation of the shaft portion (102), the tilting of the central axial line of the shaft member (10) with respect to the central axial line of the axial bore (26) can be finely adjusted so that an extremely high precision in straightness can be achieved.

Preferably, in the shaft end adapter of the present invention, a flange portion (100) is integrally formed in a base end of the tubular portion (24) located axially remote from the free end thereof via a shaft portion (102), and is provided with a plurality of circumferentially arranged threaded holes (112), a screw member (114) being threaded into each of the threaded holes (112) so as to abut an end surface of the base end at a free end thereof.

According to this arrangement, by individually adjusting the threading amounts of the screw members (110) into the threaded holes (112), and thereby causing a corresponding bending deformation of the shaft portion (102), the tilting of the central axial line of the shaft member (10) with respect to the central axial line of the axial bore (26) can be finely adjusted so that an extremely high precision in straightness can be achieved.

Preferably, in the shaft end adapter of the present invention, the clamp member comprises a fastening bolt (42) threaded into the tubular portion (24) and extending across the slit (30) at each of at least two axial positions.

According to this arrangement, the closing of the slit (30) by the fastening bolts (42) can be accomplished evenly over the entire axial length of the slit (30) so that the tilting of the central axial line of the shaft member (10) with respect to the central axial line of the axial bore (26) can be avoided, and a high precision in coaxiality and axial straightness can be achieved between the shaft member (10) and the shaft end adapter (20).

Preferably, in the shaft end adapter of the present invention, an outer circumferential surface of the tubular portion (64) is provided with a tapered outer circumferential surface (78, 80) in each of at least in two axial positions thereof, and the clamp member comprises a collet sleeve (82, 90, 94) fitted on the tubular portion and provided with a tapered bore defining tapered inner circumferential surfaces (84, 84A, 84B, 92, 96) configured to engage the corresponding tapered outer circumferential surfaces (78, 80).

According to this arrangement, the slit (70) can be closed by the collet sleeve (82, 90, 94) over the entire axial length thereof so that the tilting of the central axial line of the shaft member (10) with respect to the central axial line of the axial bore (66) can be avoided, and a high precision in coaxiality and axial straightness can be achieved between the shaft member (10) and the shaft end adapter (60).

The present invention also provides a ball screw assembly including the shaft end adapter (20, 60) as defined above according to the present invention and a ball screw shaft (10) attached thereto.

According to this arrangement, the assembling of the shaft member (10) and the shaft end adapter (20, 60) which are manufactured separately can be accomplished simply by the operation of the clamp member (42, 82, 90, 94) with a high precision in coaxiality and straightness in a highly efficient manner.

Effect of the Invention

Because the part of the tubular portion (24, 64) adjacent to the open end (26B, 66B) of the axial bore (26, 66) defines a circumferential continuous surface by the circumferentially continuous portion (32, 72), and demonstrates a high stiffness owing to the completely closed annular cross section thereof, even when the tubular portion (24, 64) is caused to undergo an elastic deformation in the direction to close the slit (30, 70), this part is less susceptible to elastic deformation, and maintains a truly circular configuration. Therefore, the assembly of the shaft member (10) and the shaft end adapter (20, 60) which are manufactured separately can be accomplished simply by the operation of the clamp member (42, 82, 90, 94) with a high precision in coaxiality and straightness in a highly efficient manner.

BRIEF DESCRIPTION OF THE DRAWINGS

Now the present invention is described in the following with reference to the appended drawings, in which.

DESCRIPTION OF THE PREFERRED EMBODIMENT(S)

Figure 1:
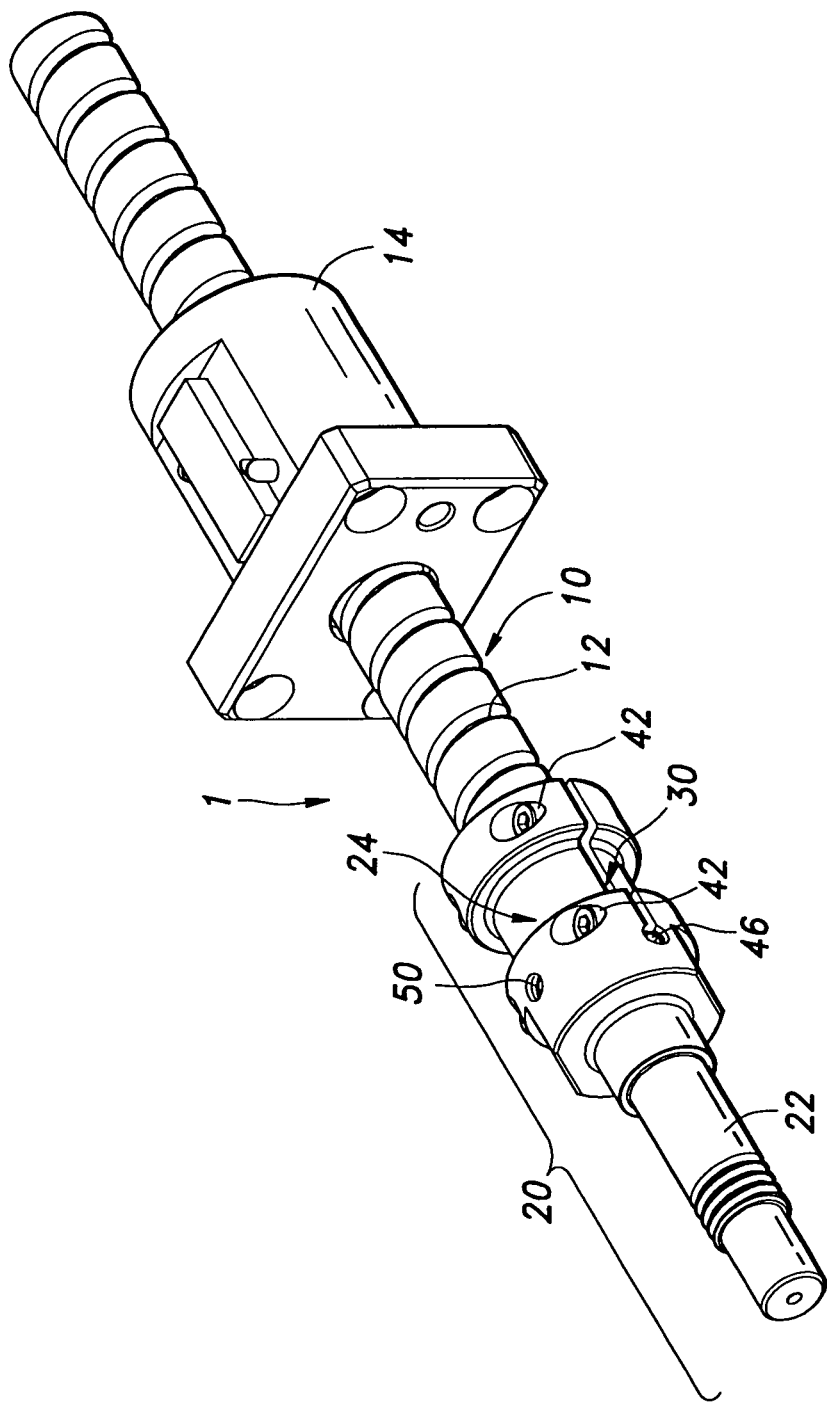
FIG. 1 A perspective view showing the overall structure of the shaft end adapter and the ball screw assembly given as the first embodiment of the present invention.
Figure 2:
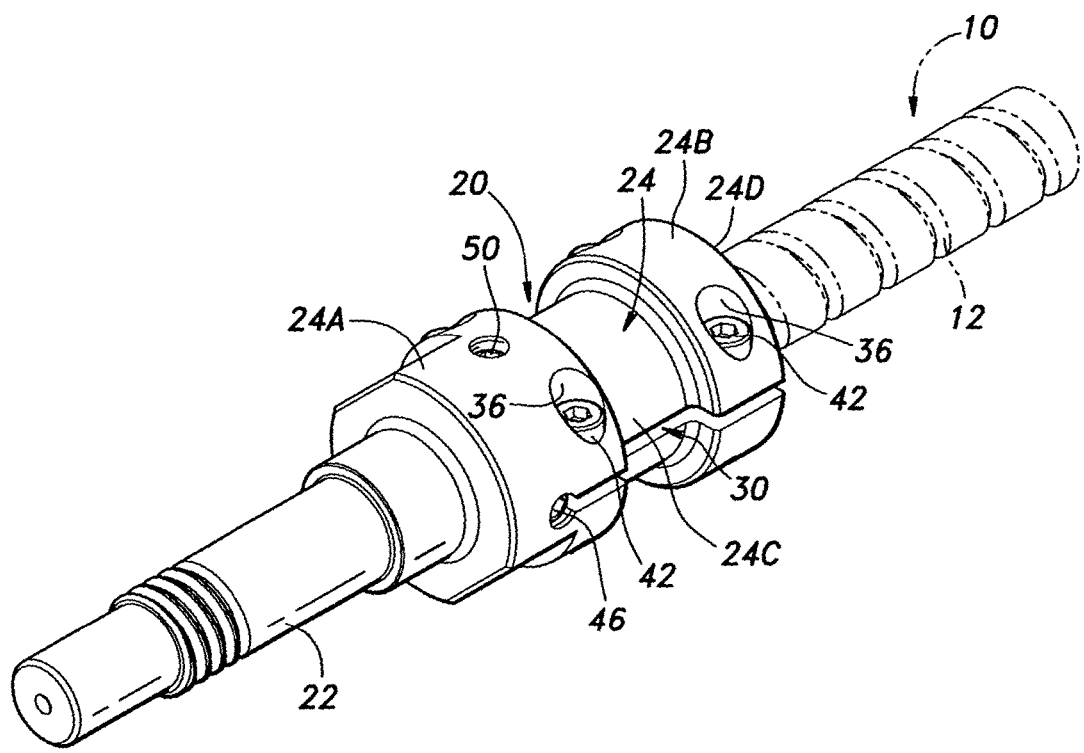
FIG. 2 A perspective view of the shaft end adapter and the ball screw assembly of the first embodiment as seen from the base end thereof.
Figure 3:
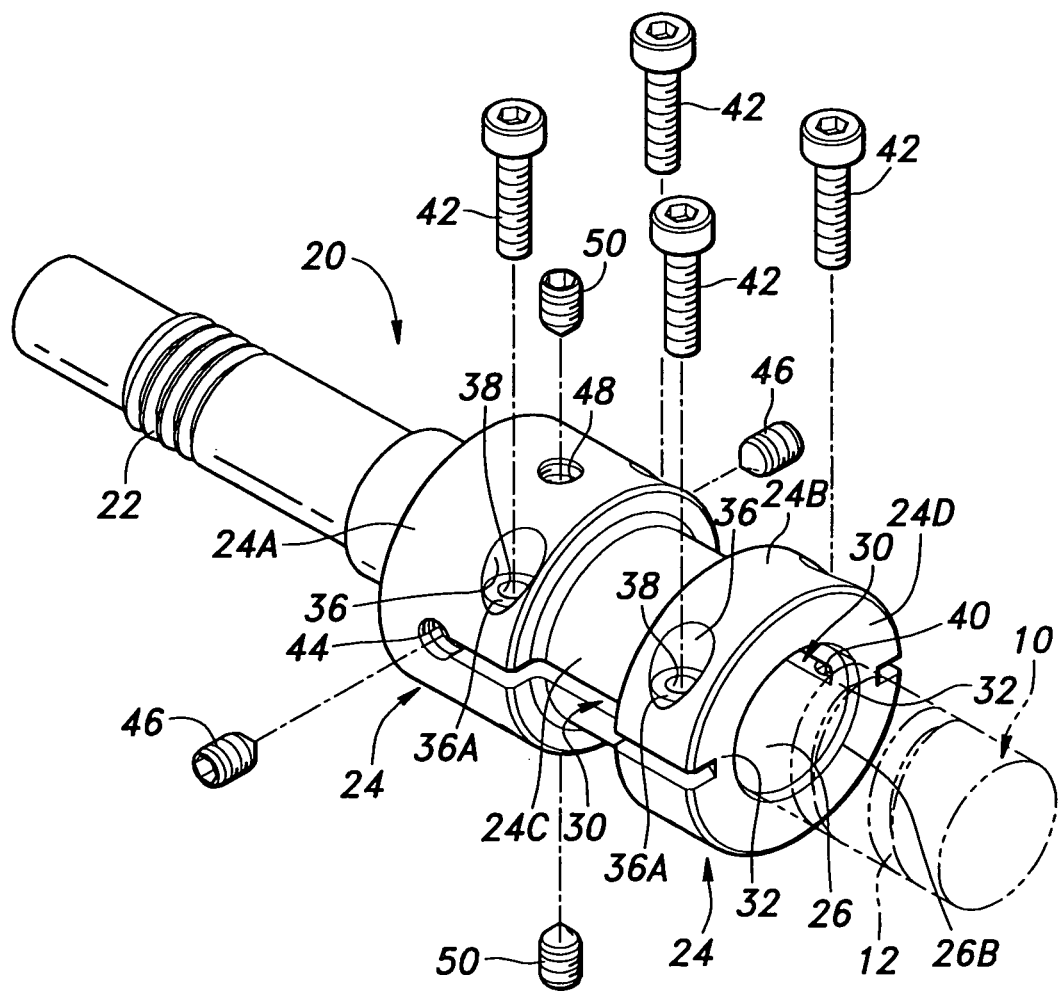
FIG. 3 An exploded perspective view of the shaft end adapter and the ball screw assembly of the first embodiment as seen from the free end thereof.

The shaft end adapter and the ball screw assembly given as the first embodiment of the present invention are described in the following with reference to FIGS. 1 to 7.

The ball screw assembly 1 of the illustrated embodiment is an assembly of a ball screw shaft 10 and a shaft end adapter 20. A helical thread groove 12 is formed on the outer circumferential surface of the ball screw shaft 10. A ball nut 14 is threaded onto the ball screw shaft 10 via balls (not shown in the drawings) rolling in the thread groove 12.

The shaft end adapter 20 is integrally formed with a mounting shaft portion 22 and a tubular portion 24 in a coaxial and axially linear configuration. The mounting shaft portion 22 is configured to be supported by a fixed part (not shown in the drawings) via a bearing device typically fitted with a ball bearing (not shown in the drawings) in a rotatable manner around an axial center line thereof. The mounting shaft portion 22 may also be a shaft portion fitted with a gear or the like for transmitting the output torque of an electric motor not shown in the drawings.

The tubular portion 24 is provided with a pair of large diameter portions 24A and 24B in an axially spaced apart relationship on the side of the mounting shaft portion 22 (base end side) and the side remote from the mounting shaft portion 22 (free end side), respectively, and generally defines an outer profile consisting of the two large diameter portions 24A and 24B and a small diameter portion 24C connecting the two large diameter portions 24A and 24B to each other.

The tubular portion 24 is formed with an axial bore 26 for receiving an end of the ball screw shaft 10. The axial bore 26 is coaxial and axially linear with respect to the mounting shaft portion 22, and has a closed end, opening only at the end surface 24D on the free end of the tubular portion 24. The axial bore 26 is provided with a circular cross section having an inner diameter which is equal to or slightly greater than the outer diameter of the ball screw shaft 10. The axial bore 26 thus defines an open end 26B on the end surface 24D of the tubular portion 24.

The axial bore 26 is provided with a bottom surface 26A at an axially middle point of the large diameter portion 24A (may not be exactly one half of the axial length of the large diameter portion 24A). The bottom surface 26A preferably extends perpendicularly to the central axial line of the axial bore 26. In this case, the free end surface 10A of the ball screw shaft 10 extends perpendicularly to the central axial line of the ball screw shaft 10 so that the ball screw shaft 10 may be threaded into the axial bore 26 until the free end surface 10A abuts the bottom surface 26A.

Figure 4:
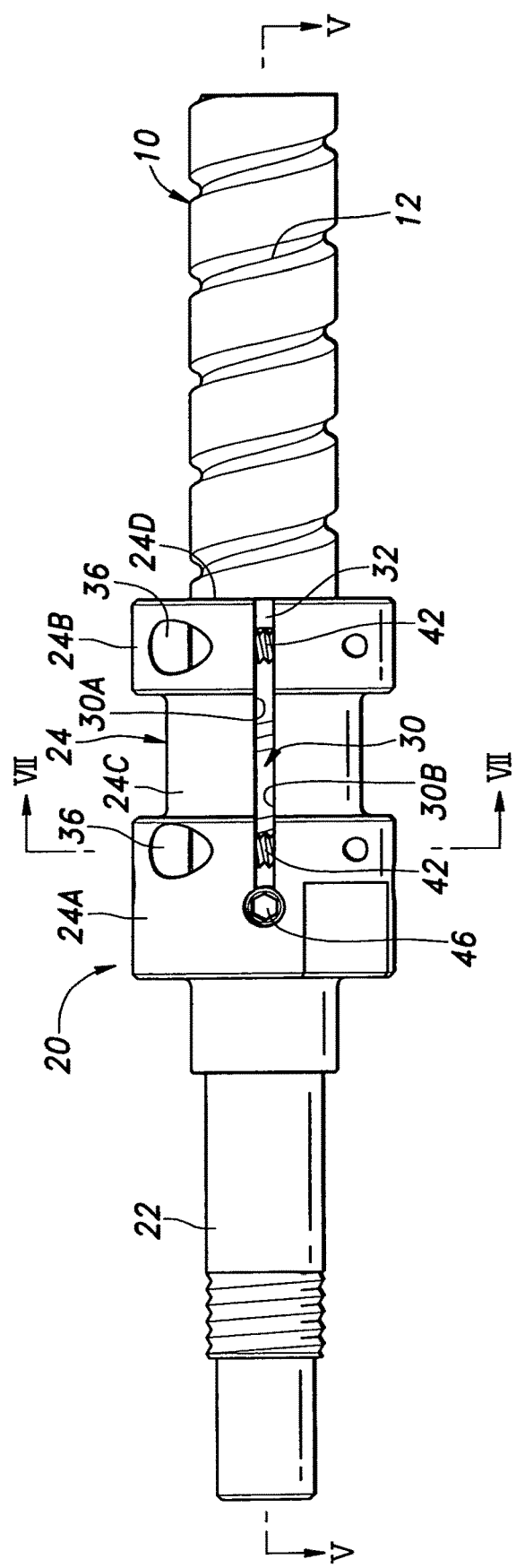
FIG. 4 A side view of the shaft end adapter and the ball screw assembly of the first embodiment.
Figure 6:
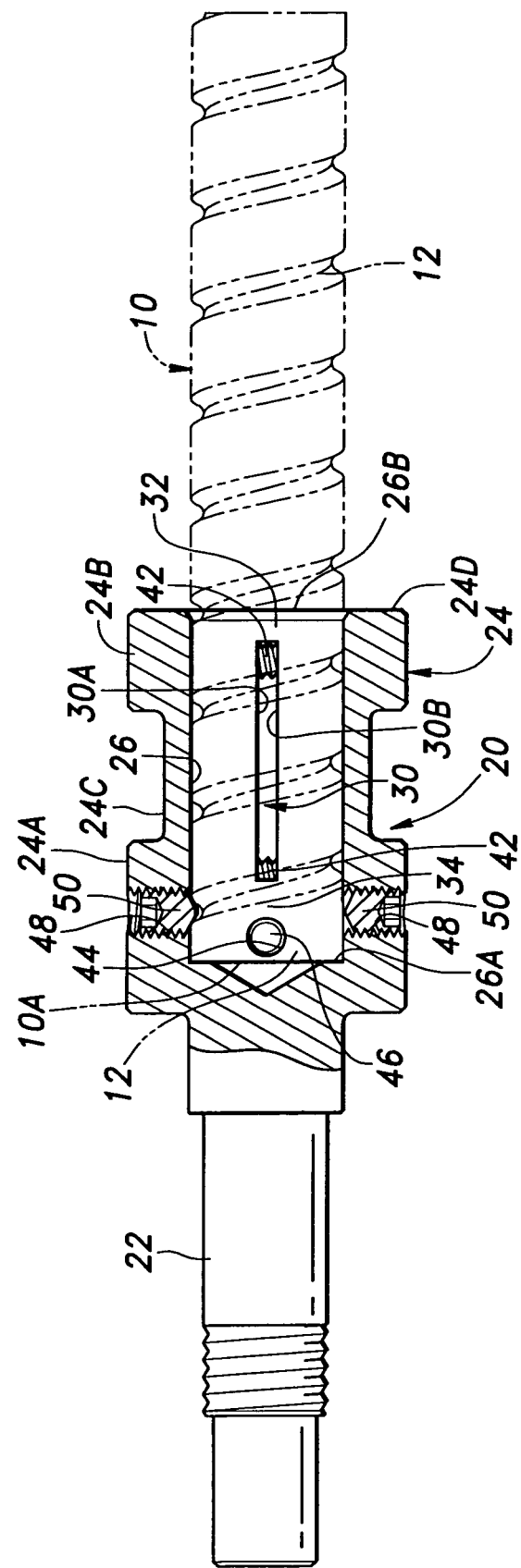
FIG. 6 A sectional view taken along line VI-VI of FIG. 5.
Figure 7:
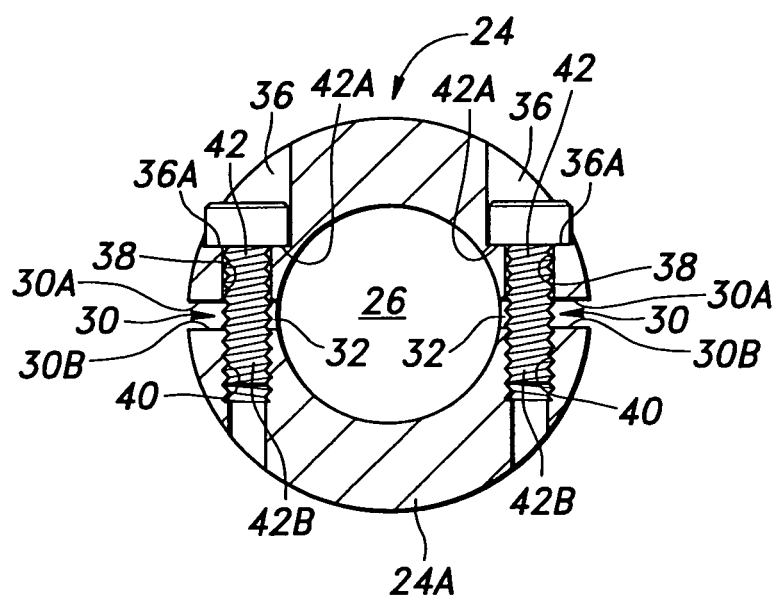
FIG. 7 A sectional view taken along line VII-VII of FIG. 4.

The tubular portion 24 is provided with a pair of axial slits 30 at an angular interval of 180 degrees around the central axial line thereof. Each slit 30 is defined by a pair of flat side surfaces 30A and 30B opposing each other while defining a small gap (a certain slit width) therebetween (as shown in FIGS. 4, 6 and 7), and opens out on both the outer circumferential surface of the tubular portion 24 and the inner circumferential surface of the tubular portion 24 defining the axial bore 26. Each slit 30 terminates at a circumferentially continuous portion 32 (first continuous portion 32) in the part adjacent to the free end of the tubular portion 24 and a circumferentially continuous portion 34 (second continuous portion 34) adjacent to the base end of the tubular portion 24.

The terms "adjacent to the free end" and "adjacent to the base end" as used herein include the free end itself and the base end itself, respectively. The term "adjacent to" and "adjoining" as used throughout this application should be understood in such a meaning.

Figure 5:
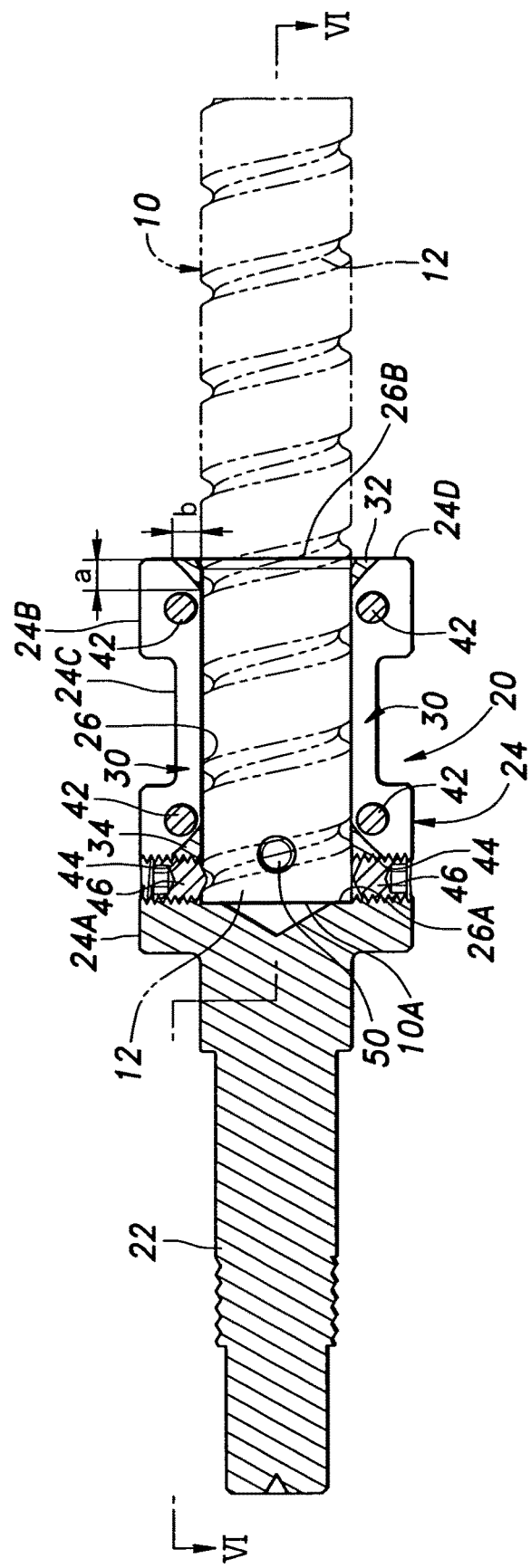
FIG. 5 A sectional view taken along line V-V of FIG. 4.

More specifically, the first continuous portion 32 defines a circumferentially continuous inner circumferential surface that is provided with a same inner diameter as the axial bore 26 and extends axially from the open end 26B of the axial bore 26 toward the bottom surface 26A by a relatively small distance a (see FIG. 5), and a circumferentially continuous flat end surface that extends radially from the open end of the axial bore 26 at the end surface 24D of the tubular portion 24 by a relatively small distance b (see FIG. 5). Thus, the first continuous portion 32 is present only in the part adjacent to the open end 26B of the axial bore 26 with respect to the axial direction of the tubular portion 24, and only in the peripheral part of the open end 26B of the axial bore 26 with respect to the radial direction of the tubular portion 24, without reaching the outer circumferential surface of the large diameter portion 24B. Therefore, on the exterior of the large diameter portion 24B, each slit 30 extends axially to the end surface 24D.

The second continuous portion 34 defines a circumferentially continuous surface that is provided with a same inner diameter as the first continuous portion 32 over an axial region extending between the terminal end of the slit 30 on the side of the bottom surface 26A of the axial bore 26 and the bottom surface 26A. This circumferentially continuous surface forms a part of the axial bore 26 in the illustrated embodiment.

Each of the large diameter portions 24A and 24B of the tubular portion 24 is provided with a bolt mounting recess 36 for each slit 30. Each bolt mounting recess 36 is provided with a seat surface 36A defined by a flat surface perpendicular to the widthwise direction of the slit 30 or in parallel with the side surfaces 30A and 30B of the slit 30 (see FIGS. 3 and 7). The large diameter portions 24A and 24B of the tubular portion 24 are provided with four bolt receiving holes 38 (see FIG. 7) in all each extending from the corresponding seat surface 36A to the adjoining side surface 30A of the slit 30. The large diameter portions 24A and 24B of the tubular portion 24 are provided with four threaded holes 40 (see FIG. 7) in all each extending from the other side surface 30B of the slit 30 to the outer circumferential surface of the corresponding large diameter portion 24A, 24B in a coaxial relationship to the corresponding bolt receiving holes 38.

A fastening bolt 42 consisting of an Allen screw is passed into each of the bolt receiving holes 38. Each fastening bolt 42 is passed across the slit 30 with a shoulder surface 42A (see FIG. 7) of the head of the fastening bolt 42 abutting the corresponding seat surface 36A, and a threaded portion 42B in the free end portion of the fastening bolt 42 is threaded into the corresponding threaded hole 40 (see FIG. 7) across the slit 30 so that the slits 30 is closed as the fastening bolts 42 are threaded into the threaded hole 40.

These fastening bolts 42 provide a clamping action for the tubular portion 24 at the positions of the two large diameter portions 24A and 24B which are axially spaced apart from each other, on either side of tubular portion 24 in each case. In particular, the clamping action for the large diameter portion 24B occurs adjacent to the first continuous portion 32, and the clamping action for the large diameter portion 24A occurs adjacent to the second continuous portion 34. In other words, the two clamping portions provided by the fastening bolts 42 are located adjacent to the axial terminal ends of the slits 30.

The large diameter portion 24A is formed with a pair of threaded holes 44 passed across the thickness thereof and opening out in the axial bore 26 in an angularly 180 degree apart relationship around the central axial line. An adjustment screw 46 consisting of an Allen set screw is threaded into each threaded hole 44. The large diameter portion 24A is additionally formed with a pair of threaded holes 48 passed across the thickness thereof and opening out in the axial bore 26 in an angularly 180 degree apart relationship around the central axial line and in an axially offset manner in relation with the threaded holes 44. An adjustment screw 50 consisting of an Allen set screw is threaded into each threaded hole 48.

Each adjustment screw 46, 50 is provided with a pointed conical free end that is configured to engage the outer circumferential surface of the ball screw shaft 10 received in the axial bore 26.

When the lead of the ball screw shaft 10 is 5 mm, the axial offset between the threaded holes 44 and 48 may be 2.5 mm. According to this arrangement, when the lead of the ball screw shaft 10 is 5 mm, 10 mm and so on, without regard to the angular position of the ball screw shaft 10 relative to the shaft end adapter 20 around the central axial line, one of the adjustment screws 46 and/or one of the adjustment screws 50 engage the thread groove 12 of the ball screw shaft 10, and the remaining ones engage the thread ridge of the ball screw shaft 10 (or any peripheral part thereof other than the thread groove 12) (see FIGS. 5 and 6). Thereby, the adjustment screws 46 and 50 provide the function of a stopper that prevents the ball screw shaft 10 from axially coming off from the axial bore 26 during the assembly process.

The axial offset between the threaded holes 44 and 48 may also be one quarter of the lead of the ball screw shaft 10. In this case, without regard to the lead of the ball screw shaft 10, at least one of the adjustment screws 46 and at least one of the adjustment screws 50 engage the thread groove 12 of the ball screw shaft 10, and a favorable stopper action can be achieved.

The assembling procedure for the ball screw shaft 10 and the shaft end adapter 20 is described in the following.

First of all, with all of the fastening bolts 42 and the adjustment screws 46 and 50 unfastened, an end of the ball screw shaft 10 is fitted into the axial bore 26 from the open end 26B thereof until the free end surface 10A of the ball screw shaft 10 abuts the bottom surface 26A of the axial bore 26.

The two fastening bolts 42 of each large diameter portion 24A, 24B are then fastened. This causes the slits 30 to reduce the widths thereof owing to the elastic deformation of the material of the tubular portion 24 adjoining the slits 30. The resulting frictional engagement between the outer circumferential surface of the ball screw shaft 10 and the inner circumferential surface of the axial bore 26 causes the end of the ball screw shaft 10 to be clamped by the shaft end adapter 20 so that the ball screw shaft 10 is integrally joined to the shaft end adapter 20.

The parts of the axial bore 26 adjacent to the open end 26B and the bottom surface 26A thereof which are axially spaced apart from each other define circumferentially continuous inner circumferential surfaces having a same inner diameter as the remaining part of the axial bore 26 by the first continuous portion 32 and the second continuous portion 34, and demonstrate a high stiffness owing to the completely closed annular cross section thereof. Therefore, even when the tubular portion 24 undergoes an elastic deformation in the direction to close the slits 30, these continuous portions 32 and 34 maintain a substantially truly circular configuration.

Therefore, the parts of the axial bore 26 adjacent to the open end 26B thereof corresponding to the first continuous portion 32 and the bottom surface 26A corresponding to the second continuous portion 34 which are axially spaced apart from each other are ensured with a high precision in coaxiality and axial straightness as achieved by the machining of the axial bore 26. Thereby, a high precision in coaxiality and axial straightness is ensured to the assembly of the ball screw shaft 10 and the shaft end adapter 20 formed by the fitting of the ball screw shaft 10 into the axial bore 26.

Because the first continuous portion 32 defines a circumferential inner surface which is continuous with and has a same inner diameter as the inner circumferential surface of the part of the axial bore 26 adjacent to the free end of the tubular portion 24, the circularity of the adjacent part of the axial bore 26 can be ensured in a favorable manner. These factors contribute to the enhancement of the precision in the coaxiality and axial straightness of the assembly of the ball screw shaft 10 and the shaft end adapter 20.

Because the fastening bolts 42 are provided in the two large diameter portions 24A and 24B which are axially spaced apart and located adjacent to the axial terminal ends of the slit 30, the fastening bolts 42 are enabled to close the slit 30 evenly over the entire axial length thereof. For this reason, the tilting of the central axial line of the ball screw shaft 10 with respect to the central axial line of the axial bore 26 can be minimized, and a high precision in the coaxiality and axial straightness of the assembly of the ball screw shaft 10 and the shaft end adapter 20 can be ensured.

If the desired precision in the straightness of the assembly is not achieved upon assembling of the ball screw shaft 10 and the shaft end adapter 20 by the fastening of the fastening bolts 42, the four adjustment screws 46 and 50 that are arranged at the angular interval of 90 degrees around the central axial line of the axial bore 26 may be turned until the free ends of the adjustment screws 46 and 50 abut the outer circumferential surface of the ball screw shaft 10. By individually changing the threading amount of each adjustment screw 46, 50, the radial pressure applied to the ball screw shaft 10 by the adjustment screws 46 and 50 at the angular interval of 90 degrees can be adjusted.

Thereby, the tilting of the central axial line of the ball screw shaft 10 with respect to the central axial line of the axial bore 26 can be finely adjusted so that a high precision in the straightness of the assembly can be achieved.

The ball screw shaft 10 and the shaft end adapter 20 which are manufactured as two separate members can be assembled in a highly efficient manner with a high precision in coaxiality and straightness simply by the adjustment of the screws.

Figure 8:
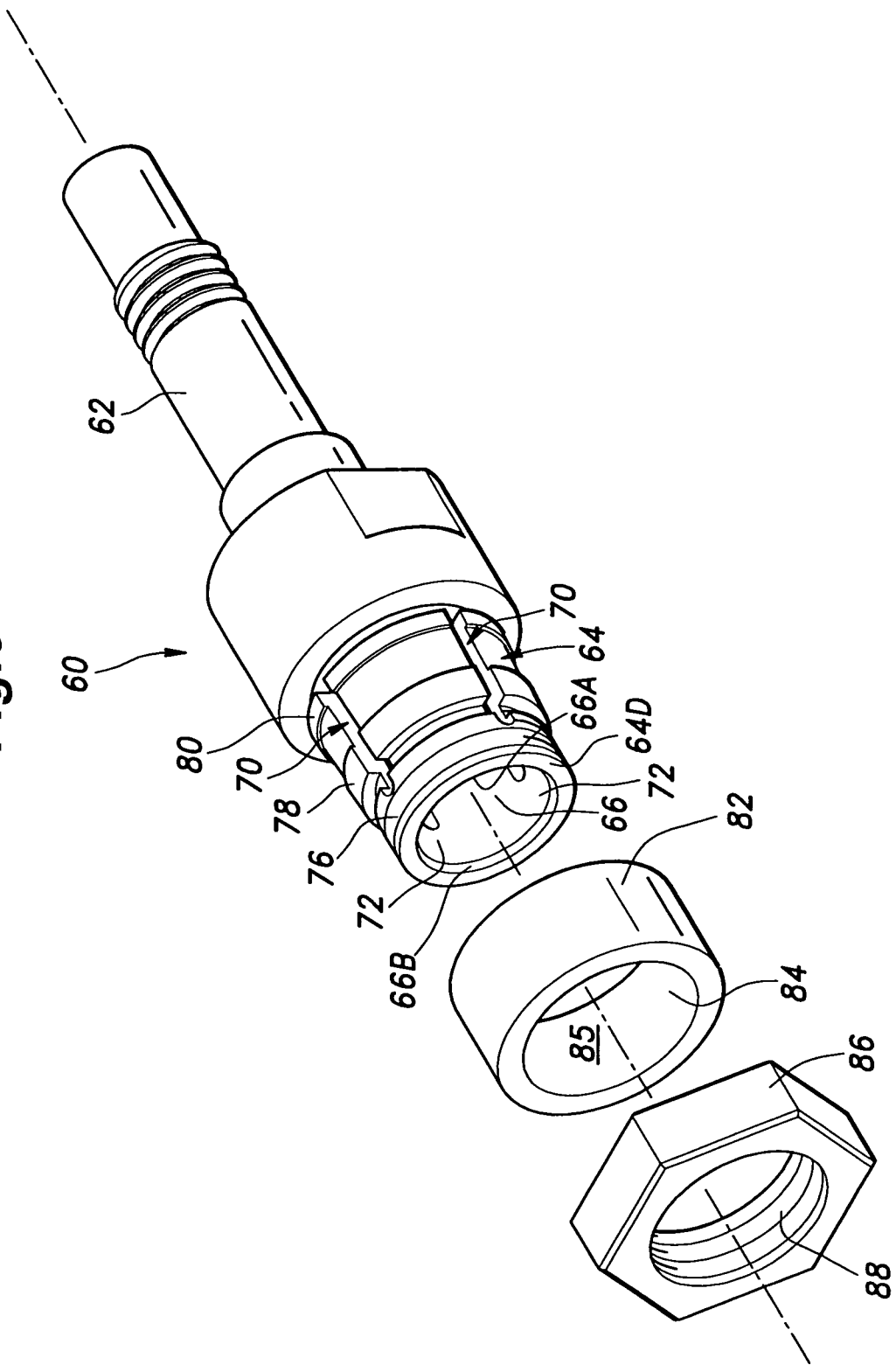
FIG. 8 An exploded perspective view of the shaft end adapter and the ball screw assembly given as the second embodiment of the present invention.
Figure 9:
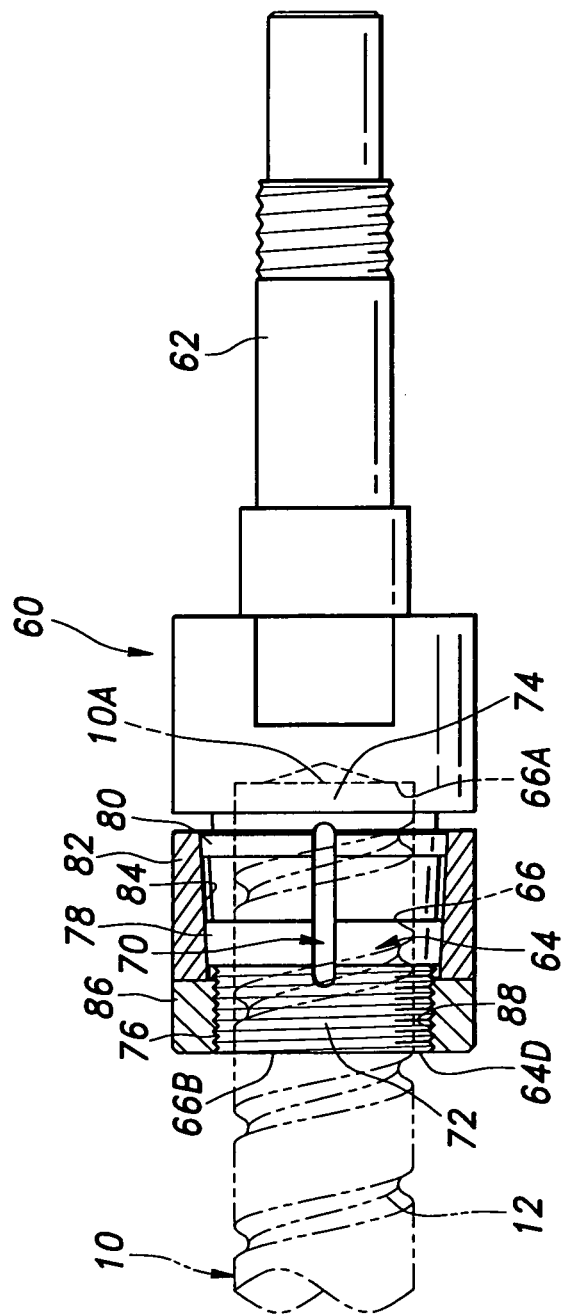
FIG. 9 A sectional view of the shaft end adapter and the ball screw assembly of the second embodiment.

The second embodiment of the shaft end adapter and the ball screw assembly is described in the following with reference to FIGS. 8 and 9.

The ball screw assembly of this embodiment consists of an assembly of a ball screw shaft 10 and the shaft end adapter 60. The ball screw shaft 10 is no different from that of the first embodiment. The shaft end adapter 60 is provided with a mounting shaft portion 62 and a tubular portion 64 which are integrally formed with each other in a coaxial and axially straight manner.

The tubular portion 64 is formed with an axial bore 66 for receiving an end of the ball screw shaft 10. The axial bore 66 is coaxial and axially linear with respect to the mounting shaft portion 62, and has a closed end, opening only at the end surface 64D on the free end of the tubular portion 64 and defining a bottom surface 66A on the base end side (the side of the mounting shaft portion 62). The axial bore 66 thus defines an open end 66B on the end surface 64D of the tubular portion 64. Preferably, the bottom surface 66A also extends perpendicularly to the central axial line of the axial bore 66. The axial bore 66 is provided with a circular cross section having an inner diameter equal to or slightly greater than the outer diameter of the ball screw shaft 10.

The tubular portion 64 is provided with four axial slits 70 at an angular interval of 90 degrees around the central axial line. Each slit 70 is defined by a pair of flat side surfaces opposing each other while defining a small gap (with a certain slit width) therebetween, and opens out on both the outer circumferential surface of the tubular portion 64 and the inner circumferential surface of the tubular portion 64 defining the axial bore 66. Each slit 70 terminates at a circumferentially continuous portion 72 (first continuous portion 72) in the part adjacent to the free end of the tubular portion 64 and a circumferentially continuous portion 74 (second continuous portion 74) adjacent to the base end of the tubular portion 64.

More specifically, the first continuous portion 72 defines a circumferentially continuous inner circumferential surface having a same inner diameter as the axial bore 66 adjacent to the free end of the tubular portion 64, and a circumferentially continuous flat end surface 64D. The second continuous portion 74 defines a circumferentially continuously surface that is provided with a same inner diameter as the first continuous portion 72 over an axial region extending between the terminal end of the slit 70 on the side of the bottom surface 66A of the axial bore 66 and the bottom surface 66A.

The outer circumferential surface of the tubular portion 64 includes a male thread portion 76, a first tapered outer circumferential surface 78 and a second tapered outer circumferential surface 80, in that order from the free end side thereof. The first tapered outer circumferential surface 78 and the second tapered outer circumferential surface 80 are axially spaced away from each other, and are provided with a same tapering, narrowing toward the free end side. The slits 70 extend over the entire length of the first tapered outer circumferential surface 78 and the second tapered outer circumferential surface 80. In particular, the first tapered outer circumferential surface 78 and the second tapered outer circumferential surface 80 are provided in the parts of the tubular portion 64 adjacent to the respective terminal ends of the slit 70.

On the outer circumferential surface of the tubular portion 64 is fitted a collet sleeve 82 provided with a tapered bore 85 defined by a tapered inner circumferential surface 84 engaging both the first tapered outer circumferential surface 78 and the second tapered outer circumferential surface 80. A female thread portion 88 of a fastening nut 86 threadably engages the male thread portion 76.

The assembling procedure for the ball screw shaft 10 and the shaft end adapter 60 is described in the following.

First of all, with the fastening nut 86 unfastened, an end of the ball screw shaft 10 is fitted into the axial bore 66 from the open end 66B thereof until the free end surface 10A of the ball screw shaft 10 abuts the bottom surface 66A of the axial bore 66.

The fastening nut 86 is then fastened with the result that the collet sleeve 82 is pushed toward the base end side. Owing to the engagement of the tapered inner circumferential surface 84 with the first tapered outer circumferential surface 78 and the second tapered outer circumferential surface 80, the parts of the tubular portion 64 adjacent to the slits 70 undergo an elastic deformation so that the width of each slit 70 is reduced, and the slits 70 are closed. The resulting frictional engagement between the outer circumferential surface of the ball screw shaft 10 and the inner circumferential surface of the axial bore 66 causes the end of the ball screw shaft 10 to be clamped by the shaft end adapter 60 so that the ball screw shaft 10 is integrally joined to the shaft end adapter 60.

According to this embodiment, because the parts of the axial bore 66 adjacent to the open end 66B and the bottom surface 66A which are axially spaced apart are each defined by a circumferentially continuous surface having a same inner diameter as the axial bore 66, and given with a high stiffness owing to the annular cross sectional configuration, these parts are resistant to elastic deformation, and can maintain a truly circular shape even when the tubular portion 64 is caused to undergo an elastic deformation by the fastening nut 86 in the direction to close the slits 70.

The parts of the axial bore 66 adjacent to the open end 66B thereof corresponding to the first continuous portion 72 and the bottom surface 66A corresponding to the second continuous portion 74 which are axially spaced apart from each other are ensured with a high precision in coaxiality and axial straightness as achieved by the machining of the axial bore 66. Thereby, a high precision in coaxiality and axial straightness is ensured to the assembly of the ball screw shaft 10 and the shaft end adapter 60 formed by the fitting of the ball screw shaft 10 into the axial bore 66.

Because the first tapered outer circumferential surface 78 and the second tapered outer circumferential surface 80 are located at two different axial positions and adjacent to the terminal axial ends of the slits 70, the slits 70 are closed evenly over the entire axial length thereof by the cooperation between the collet sleeve 82 and the fastening nut 86. This factor also contributes to the enhancement of the precision in the coaxiality and axial straightness of the assembly of the ball screw shaft 10 and the shaft end adapter 60.

Because the first continuous portion 72 defines a circumferentially continuous surface having a same inner diameter as the axial bore 66 in the part thereof adjacent to the free end of the tubular portion 64, the adjoining part of the axial bore 66 can be ensured to be truly circular. Also, because the first continuous portion 72 defines a circumferential continuous surface in the end surface 64D of the tubular portion 64 on the open end side, the axial bore 66 can be ensured to be truly circular in the part thereof adjacent to the open end thereof. These factors contribute to the enhancement of the precision in the coaxiality and axial straightness of the assembly of the ball screw shaft 10 and the shaft end adapter 60.

The ball screw shaft 10 and the shaft end adapter 60 which are manufactured as two separate members can be assembled in a highly efficient manner with a high precision in coaxiality and straightness simply by the fastening of the fastening nut 86.

Figure 10:
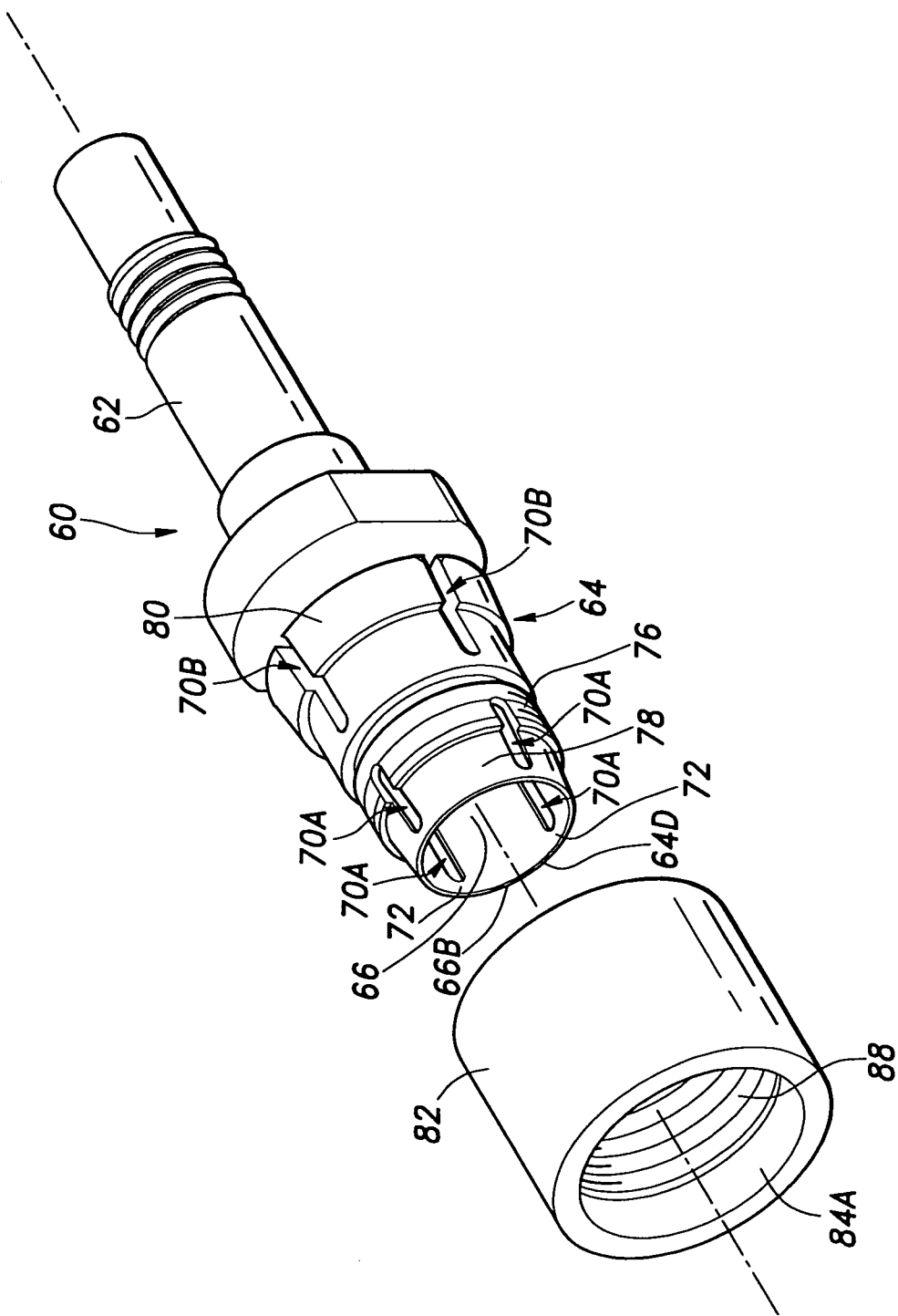
FIG. 10 An exploded perspective view of the shaft end adapter and the ball screw assembly given as the third embodiment of the present invention.
Figure 11:
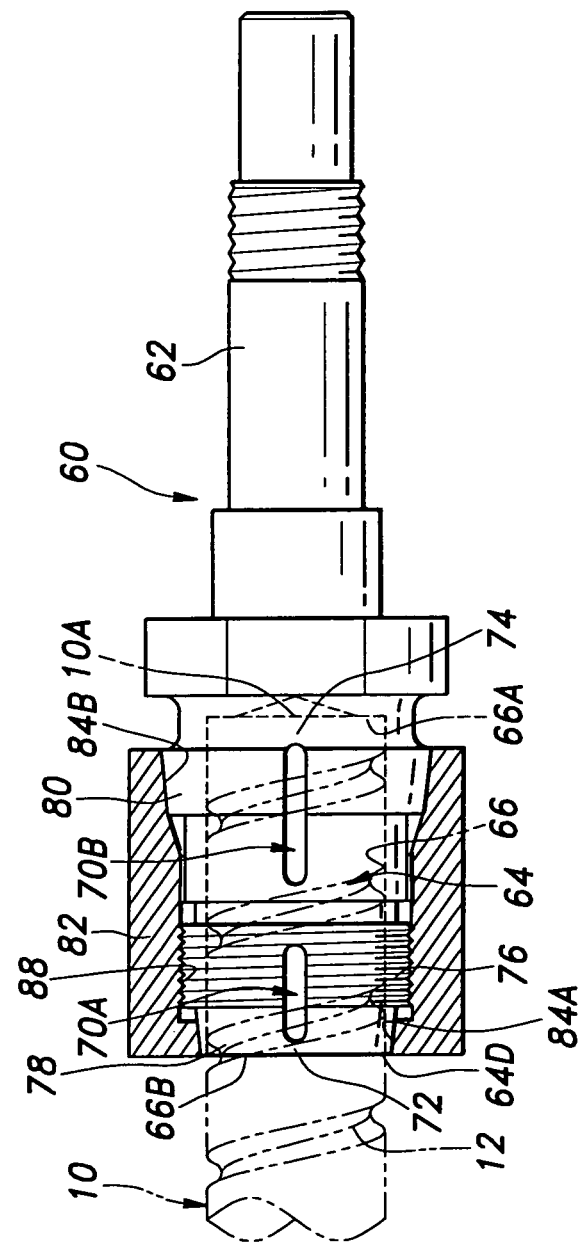
FIG. 11 A sectional view of the shaft end adapter and the ball screw assembly of the third embodiment.

The third embodiment of the shaft end adapter and the ball screw assembly is described in the following with reference to FIGS. 10 and 11. In FIGS. 10 and 11, the parts corresponding to those shown in FIGS. 8 and 9 are denoted with like numerals without necessarily repeating the description of such parts.

In this embodiment, the outer circumferential surface of the tubular portion 64 includes a first tapered outer circumferential surface 78, a male thread portion 76 and a second tapered outer circumferential surface 80, in that order from the free end side, and each slit is separated into a first slit 70A formed in the first tapered outer circumferential surface 78 and a second slit 70B formed in the second tapered outer circumferential surface 80. The inner circumferential surface of the collet sleeve 82 is separated into a first tapered inner circumferential surface 84A engaging the first tapered outer circumferential surface 78 and a second tapered inner circumferential surface 84B engaging the second tapered outer circumferential surface 80, and a female thread portion 88 is formed in the collet sleeve 82.

This embodiment is otherwise similar to the second embodiment, and therefore provides similar advantages as the second embodiment.

Figure 12:
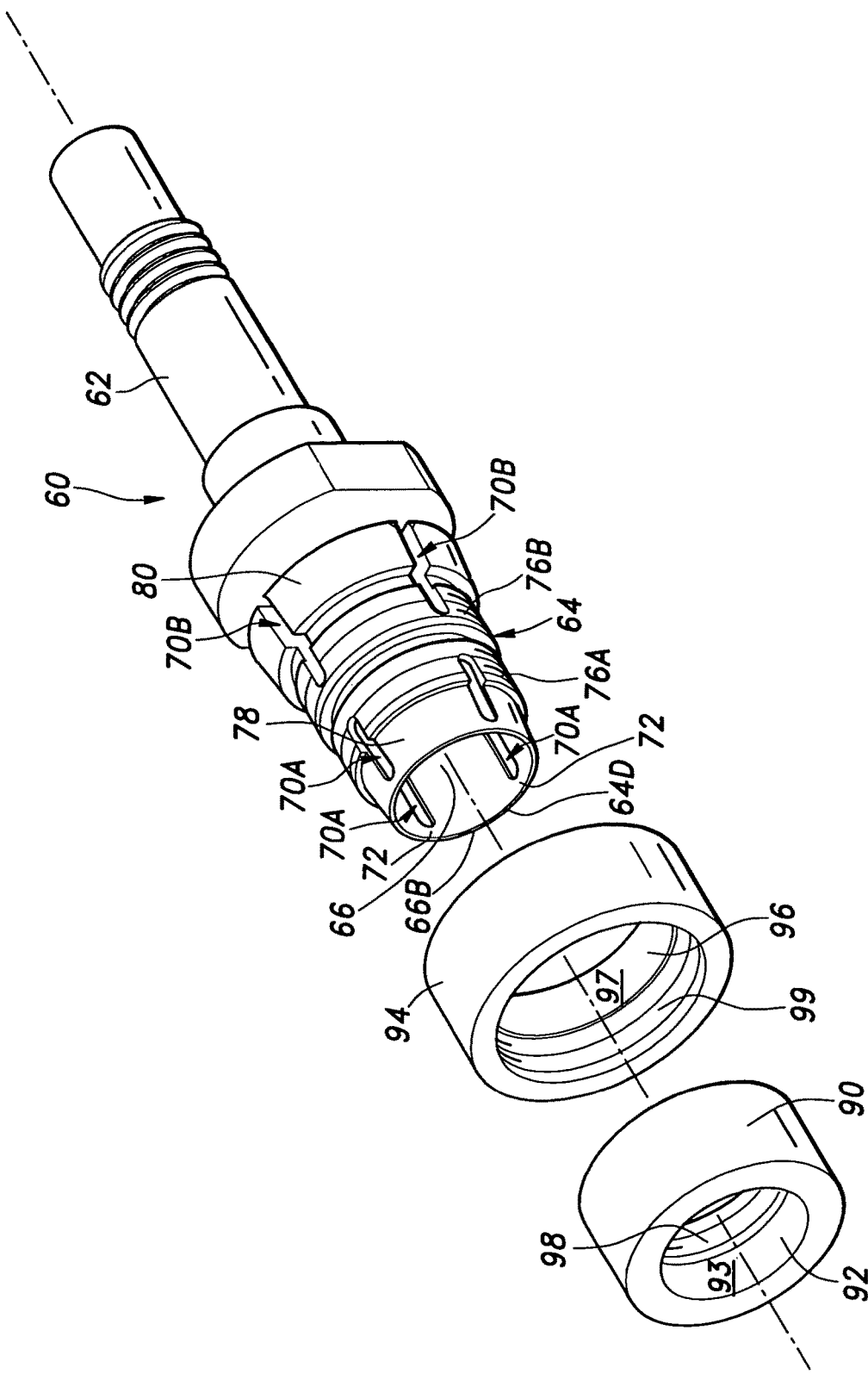
FIG. 12 An exploded perspective view of the shaft end adapter and the ball screw assembly given as the fourth embodiment of the present invention.
Figure 13:
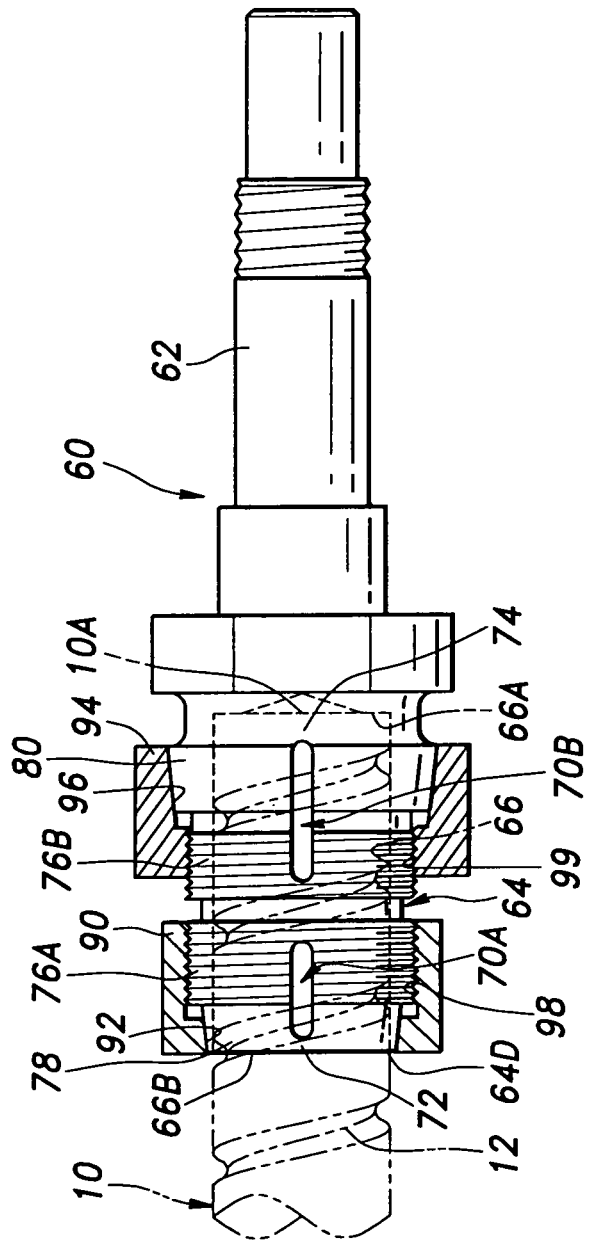
FIG. 13 A sectional view of the shaft end adapter and the ball screw assembly of the fourth embodiment.

The fourth embodiment of the shaft end adapter and the ball screw assembly is described in the following with reference to FIGS. 12 and 13. In FIGS. 12 and 13 also, the parts corresponding to those shown in FIGS. 8 and 9 are denoted with like numerals without necessarily repeating the description of such parts.

In this embodiment, the outer circumferential surface of the tubular portion 64 includes a first tapered outer circumferential surface 78, a first male thread portion 76A, a second male thread portion 76B and a second tapered outer circumferential surface 80, in that order from the free end side. The collet sleeve is separated into a first collet sleeve 90 provided with a tapered bore 93 defining a first tapered inner circumferential surface 92 engaging the first tapered outer circumferential surface 78, and a second collet sleeve 94 provided with a second tapered inner circumferential surface 96 engaging the second tapered outer circumferential surface 80. The first collet sleeve 90 is formed with a first female thread portion 98 threadably engaging the first male thread portion 76A, and the second collet sleeve 94 is formed with a second female thread portion 99 threadably engaging the second male thread portion 76B.

In this embodiment, the two sets of slits 70A and 70B can be individually closed by the actions of the first collet sleeve 90 and the second collet sleeve 94, respectively. Therefore, the clamping force at the slits 70A and the clamping force at the slits 70B can be individually adjusted so that the coaxiality and the axial straightness between the ball screw shaft 10 and the shaft end adapter 60 can be finely adjusted.

Figure 14:
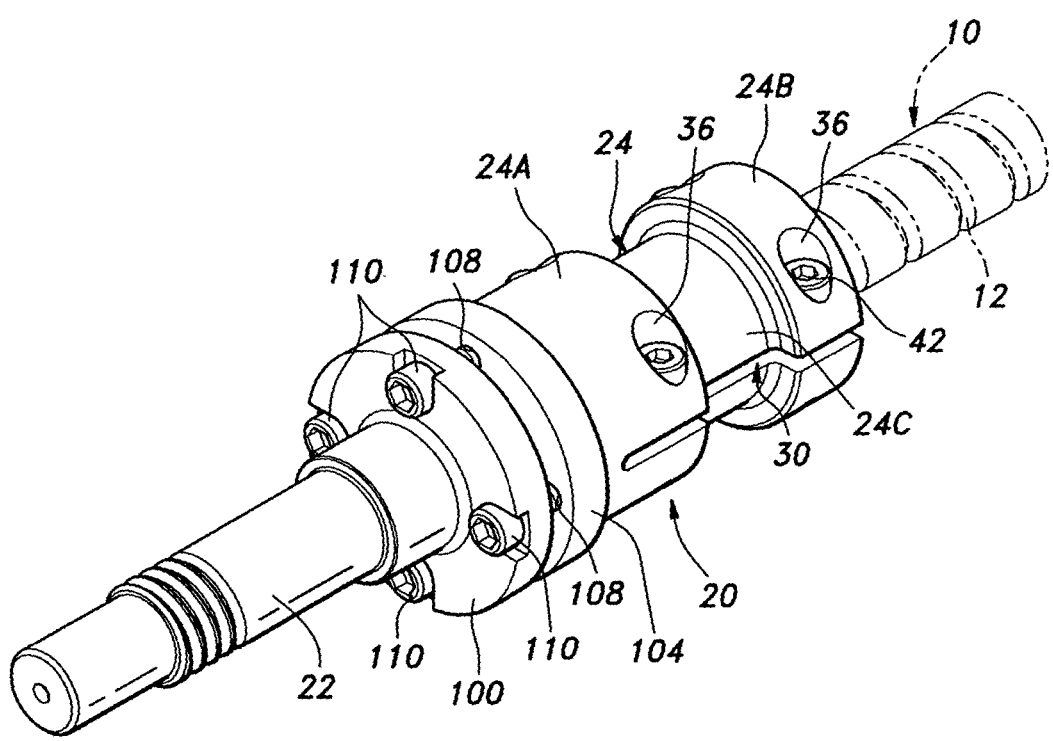
FIG. 14 A perspective view of the shaft end adapter and the ball screw assembly given as the fifth embodiment of the present invention.
Figure 15:
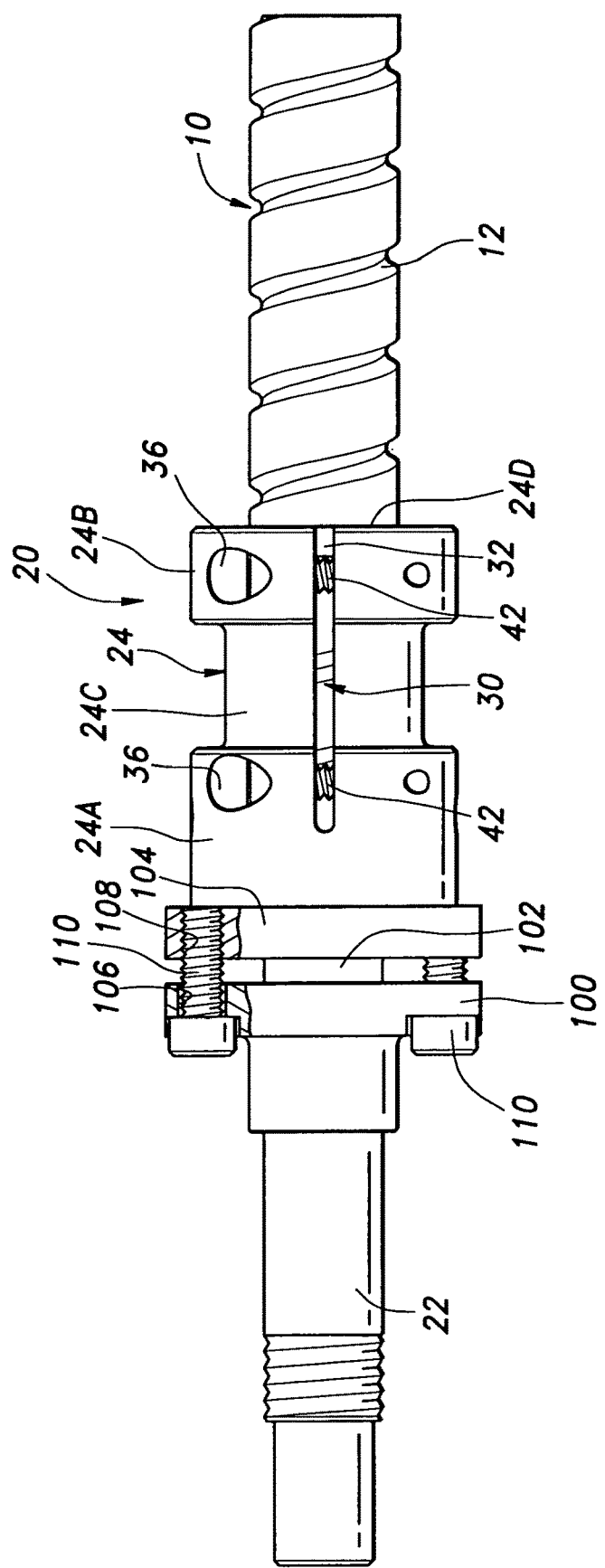
FIG. 15 A side view of the shaft end adapter and the ball screw assembly of the fifth embodiment shown partly in section.

The fifth embodiment of the shaft end adapter and the ball screw assembly is described in the following with reference to FIGS. 14 and 15. In FIGS. 14 and 15 also, the parts corresponding to those shown in FIGS. 1 to 7 are denoted with like numerals without necessarily repeating the description of such parts.

In this embodiment, a shaft side flange portion 100, a small diameter shaft portion 102 and a tubular portion side flange portion 104 are integrally formed between the mounting shaft portion 22 and the tubular portion 24. In other words, the shaft side flange portion 100 is integrally formed with the tubular portion side flange portion 104 which is in turn formed on the base end of the tubular portion 24, via the small diameter shaft portion 102.

The shaft side flange portion 100 is formed with four through holes 106 axially passing through the shaft side flange portion 100 at an angular interval of 90 degrees. The tubular portion side flange portion 104 is provided with four threaded holes 108 extending axially in axial alignment with the through holes 106 and opening out from the end surface (the end surface on the base end side of the tubular portion 24) of the tubular portion side flange portion 104 facing the shaft side flange portion 100.

An adjustment screw 110 consisting of an Allen screw is passed into each through hole 106 from the side remote from the tubular portion side flange portion 104, and is threaded into the corresponding threaded hole 108 at the free end thereof.

In this embodiment, by individually adjusting the threading amounts of the adjustment screws 110 into the corresponding threaded holes 108, the axial tensile forces that act upon the four positions of the tubular portion side flange portion 104 that are arranged at the angular interval of 90 degrees can be adjusted.

By causing a bending deformation of the small diameter shaft portion 102 according to the variations in the threading amounts of the four adjustment screws 110 into the corresponding threaded holes 108, similarly as the adjustment screws 46 and 50 of the first embodiment, the tilting of the central axial line of the ball screw shaft 10 with respect to the central axial line of the axial bore 26 can be finely adjusted so that a high precision in the straightness of the assembly can be achieved.

This embodiment is otherwise similar to the first embodiment, and therefore provides similar advantages as the first embodiment.

Figure 16:
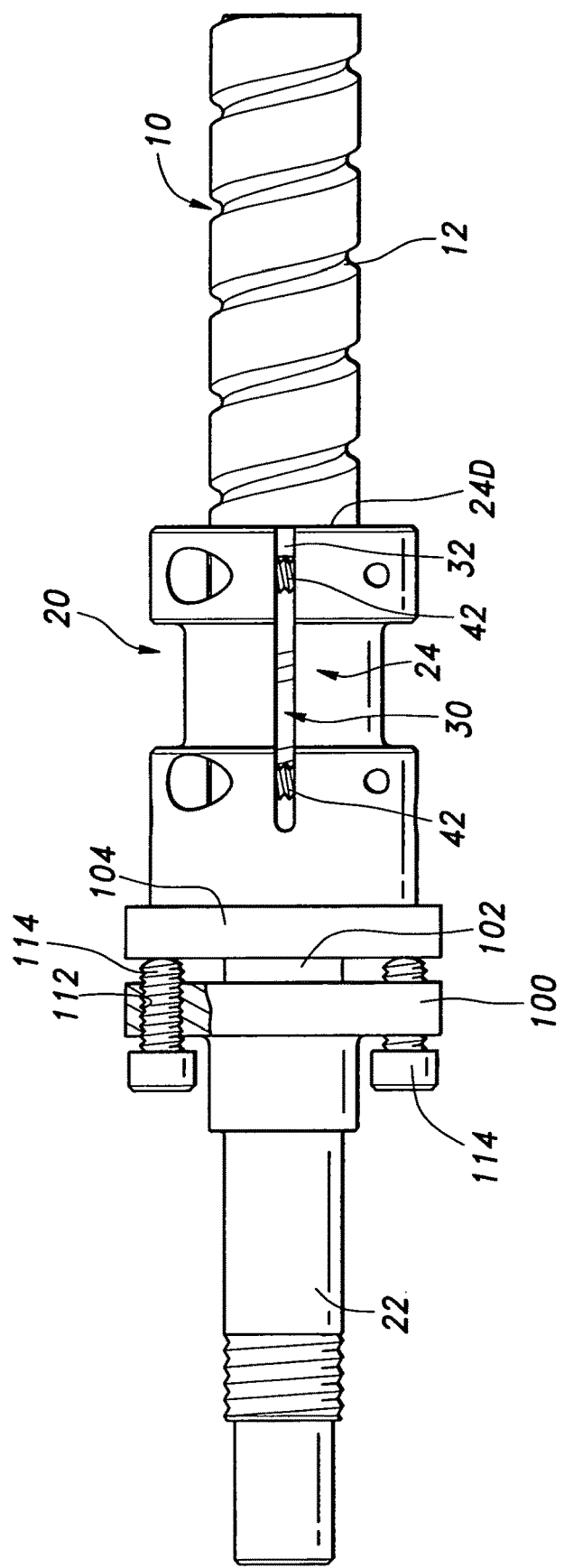
FIG. 16 A side view of the shaft end adapter and the ball screw assembly given as the sixth embodiment of the present invention.

The sixth embodiment of the shaft end adapter and the ball screw assembly is described in the following with reference to FIG. 16. In FIG. 16 also, the parts corresponding to those shown in FIGS. 14 and 15 are denoted with like numerals as those used in FIGS. 1 to 7 without necessarily repeating the description of such parts.

In this embodiment, the shaft side flange portion 100 is formed with four threaded holes 112 axially passing through the shaft side flange portion 100 at an angular interval of 90 degrees. An adjustment screw 114 consisting of an Allen screw is threaded into each threaded hole 112 from the side remote from the tubular portion side flange portion 104. The free end of each adjustment screw 114 abuts the end surface (base end surface of the tubular portion 24) of the tubular portion side flange portion 104 facing the shaft side flange portion 100.

In this embodiment, by individually adjusting the threading amounts of the adjustment screws 114 into the corresponding threaded holes 112, the axial pressures that act upon the four positions of the tubular portion side flange portion 104 that are arranged at the angular interval of 90 degrees can be adjusted.

By causing a bending deformation of the small diameter shaft portion 102 according to the variations in the threading amounts of the four adjustment screws 114 into the corresponding threaded holes 112, similarly as the adjustment screws 46 and 50 of the first embodiment, the tilting of the central axial line of the ball screw shaft 10 with respect to the central axial line of the axial bore 26 can be finely adjusted so that a high precision in the straightness of the assembly can be achieved.

This embodiment is otherwise similar to the first embodiment, and therefore provides similar advantages as the first embodiment.

Figure 17:
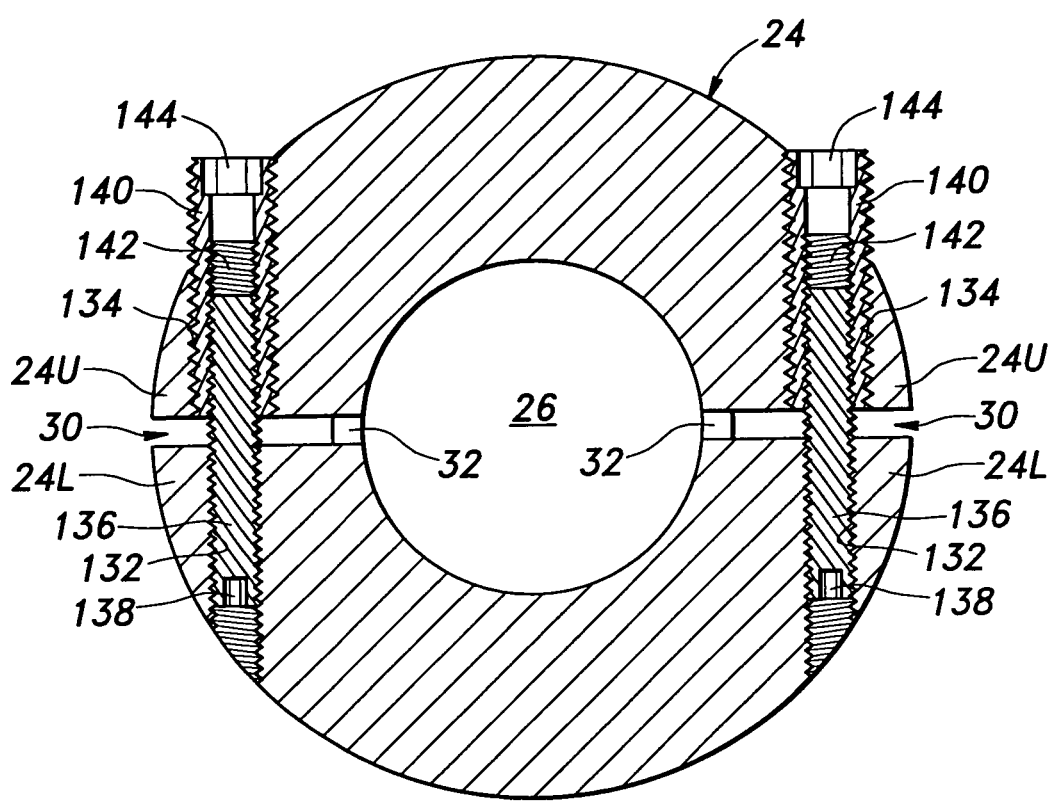
FIG. 17 An enlarged sectional view similar to the VII-VII sectional view of FIG. 4 showing the shaft end adapter and the ball screw assembly given as the seventh embodiment of the present invention.

The seventh embodiment of the shaft end adapter and the ball screw assembly is described in the following with reference to FIG. 17. In FIG. 17 also, the parts corresponding to those shown in FIG. 4 are denoted with like numerals without necessarily repeating the description of such parts.

In this embodiment a differential screw mechanism is used as the fastening mechanism (clamp member) for the slits 30. The differential screw mechanism is described in the following.

For each slit 30, the tubular portion 24 is provided with a first female threaded hole 132 passed from one side (lower side in FIG. 17) of the tubular portion 24 with respect to the slit 30 into the slit 30, and a second female threaded hole 134 having a larger diameter than the first female threaded hole 132 is passed from the other side (upper side in FIG. 17) of the tubular portion 24 with respect to the slit 30 into the slit 30 in a coaxial relationship to the first female threaded hole 132.

A first male thread member 136 provided with a hexagonal engagement recess 138 is threaded into the first female threaded hole 132. A second male thread member 140 provided with a hexagonal engagement recess 144 is threaded into the second female threaded hole 134. The second male thread member 140 is centrally formed with a third female threaded hole 142, and the first male thread member 136 is threaded into the third female threaded hole 142.

With the first male thread member 136 held stationary by engaging a wrench (not shown in the drawings) with the hexagonal engagement recess 138, the second male thread member 140 is turned in the direction to increase the amount of threading of the first male thread member 136 with the third female threaded hole 142, for instance in clockwise direction, thereby causing the second male thread member 140 to advance toward the slit 30 (or downward in FIG. 17).

As the second male thread member 140 advances by threading, the part 24U of the tubular portion 24 on the other side (upper side in FIG. 17) of the slit 30 undergoes an elastic deformation in the opposite direction to the advancing direction of the second male thread member 140 with the result that the width of the slit 30 increases, and the tubular portion 24 enlarges in the radial direction.

Thus, even when the fit between the axial bore and the ball screw shaft 10 is tight in order to ensure a high precision in coaxiality, the ball screw shaft 10 can be fitted into the axial bore 26 without any difficulty.

Once the ball screw shaft 10 is fully fitted into the axial bore 26, the ball screw shaft 10 is fastened to the shaft end adapter 20 as described in the following. With the first male thread member 136 held stationary similarly as when enlarging the diameter of the tubular portion 24, the second male thread member 140 is turned in the direction to decrease the amount of threading of the first male thread member 136 with the third female threaded hole 142, for instance in counter-clockwise direction, thereby causing the second male thread member 140 to retreat away from the slit 30 (or upward in FIG. 17).

By such a retreating movement of the second male thread member 140, the elastic deformation of the part 24U of the tubular portion 24 located on the other side of the slit 30 is removed, and the width of the slit 30 is reduced to the original value. As a result, the radial enlargement of the tubular portion 24 is canceled, and the resulting force that tends to narrow the slit 30 causes the ball screw shaft 10 to be fixed to the tubular portion 24.

With the first male thread member 136 held stationary, the second male thread member 140 may be turned in the direction to cause the second male thread member 140 to retreat further (or move upward in FIG. 17), thereby elastically deforming the part 24U of the tubular portion 24 located on the other side of the slit 30 in the direction opposite to the retreating direction of the second male thread member 140. As a result, the width of the slit 30 decreases, and the tubular portion 24 contracts in the radial direction. Thus, the ball screw shaft 10 is clamped to the shaft end adapter 20 with a prescribed clamping force. The final fastening torque should be controlled in proportion to the mechanical strength of the first male thread member 136 such that the threading engagement may not be destroyed.

Although the present invention has been described in terms of preferred embodiments thereof, it is obvious to a person skilled in the art that various alterations and modifications are possible without departing from the scope of the present invention.

For instance, the inner diameter of the first continuous portions 32, 72 adjacent to the open end 26B, 66B of the axial bore 26, 66 and the second continuous portion 34, 74 adjacent to the bottom surface 26A, 66A may be smaller than the inner diameter of the remaining part of the axial bore 26, 66. The second continuous portion 34 is not indispensable to the present invention, and a high precision in the coaxiality and axial straightness of the ball screw shaft 10 and the shaft end adapter 20 as achieved by the machining of the axial bore 26 can be achieved with the first continuous portion 32 alone. The first continuous portion 32 is not required to define a circumferentially continuous surface at the end surface 24D of the tubular portion 24 adjacent to the open end 26B, but at a part offset from the end surface 24D toward the base end side.

The number of the slits 30 and 70 are not limited to two or four, but may also be one, three or any other number. The fastening bolts 42 are not required to be provided in two places, but may also be provided three or more places. The number of the adjustment screws 46 and 50 are not limited to four, but may also be two, three or more. The shaft member is not required to be a ball screw shaft, but may also be any other shaft members.

The components shown in the foregoing embodiments are not necessarily indispensable for the present invention, but may be partly omitted or substituted without departing from the spirit of the present invention.

GLOSSARY 1 ball screw assembly
10 ball screw shaft (shaft member)
20 shaft end adapter
24 tubular portion
26 axial bore
30 slit
32 first continuous portion
34 second continuous portion
42 fastening bolt (clamping member)
44 threaded hole
46 adjustment screw (screw member)
48 threaded hole
50 adjustment screw (screw member)
60 shaft end adapter
64 tubular portion
66 axial bore
70 slit
70A first slit
70B second slit
72 first continuous portion
74 second continuous portion
78 first tapered outer circumferential surface
80 second tapered outer circumferential surface
82 collet sleeve (clamp member)
84 tapered inner circumferential surface
84A first tapered inner circumferential surface
84B second tapered inner circumferential surface
85 tapered bore
86 fastening nut (clamp member)
90 first collet sleeve (clamp member)
92 first tapered inner circumferential surface
93 tapered bore
94 second collet sleeve (clamp member)
96 second tapered inner circumferential surface
97 tapered bore
100 shaft side flange portion
102 small diameter shaft portion
104 tubular portion side flange portion
106 through hole
108 threaded hole
110 adjustment screw (screw member)
112 threaded hole
114 adjustment screw (screw member)
132 first female threaded hole
134 second female threaded hole
136 first male thread member
140 second male thread member
142 third female threaded hole

The invention claimed is:

1. A shaft end adapter, comprising:
a mounting shaft portion;
a tubular portion coaxially formed with one end of the mounting shaft portion and having an axial bottomed bore having a circular cross section and defining an opening for receiving an end of a shaft member at a free end of the tubular portion, the free end being axially remote from the mounting shaft portion, wherein the tubular portion is formed with a large diameter portion in part thereof at or adjacent to the free end thereof, and is formed with an entirely circumferentially continuous portion in a part thereof at or adjacent to the free end thereof, and wherein the tubular portion defines a slit extending axially through a wall of the tubular portion in exclusion of the entirely circumferentially continuous portion; and
a clamp member mounted on the tubular portion and configured to close the slit, wherein the clamp member comprises a fastening bolt threaded into the tubular portion and extending across the slit, wherein the large diameter portion defines a bolt mounting recess in which a bolt receiving hole opens, and wherein the bolt receiving hole is configured such that the fastening bolt is inserted into the bolt receiving hole to be threaded into the tubular portion.

2. The shaft end adapter according to claim 1, wherein the circumferentially continuous portion defines a circumferentially continuous inner circumferential surface adjacent to an open end of the axial bore.

3. The shaft end adapter according to claim 1, wherein the circumferentially continuous portion defines an axial end surface of the tubular portion at an open end of the tubular portion as a circumferentially continuous surface.

4. The shaft end adapter according to claim 1, wherein the slit extends axially in the wall of the tubular portion in exclusion of a second entirely circumferentially continuous portion formed at or adjacent to a base end thereof axially remote from the free end.

5. The shaft end adapter according to claim 1, wherein a plurality of threaded holes are passed radially across the tubular portion at circumferentially different locations, each defining an open end in the axial bore, and a screw member is threaded into each of the threaded holes, each screw member being configured to abut an outer circumferential surface of the shaft member at a free end thereof.

6. The shaft end adapter according to claim 5, wherein the tubular portion is adapted to receive a ball screw shaft as the shaft member.

7. The shaft end adapter according to claim 1, wherein a flange portion is integrally formed in a base end of the tubular portion axially remote from the free end thereof via a shaft portion, and a plurality of through holes are axially passed through the flange portion at different circumferential positions, the tubular portion being formed with a plurality of threaded holes opening out in an end surface of the base end of the tubular portion in alignment with the corresponding through holes of the flange portion, and a screw member passed into each of the through holes being threaded into the corresponding threaded hole.

8. The shaft end adapter according to claim 1, wherein a flange portion is integrally formed in a base end of the tubular portion located axially remote from the free end thereof via a shaft portion, and is provided with a plurality of circumferentially arranged threaded holes, a screw member being threaded into each of the threaded holes so as to abut an end surface of the base end at a free end thereof.

9. The shaft end adapter according to claim 1, wherein the fastening bolt is threaded into the tubular portion and extending across the slit at each of at least two axial positions, at least one of the positions being in the large diameter portion.

10. A ball screw assembly including the shaft end adapter according to claim 1 and a ball screw shaft attached thereto.

* * * * *